US005269002A

United States Patent [19]

Bourgouin et al.

[11] Patent Number: 5,269,002

[45] Date of Patent: Dec. 7, 1993

[54] METHOD AND DEVICE FOR DRIVING MULTIPLE LATCHING RELAYS

[75] Inventors: Jacques Bourgouin, Laval; Gerard Terreault, Pierrefonds, both of Canada

[73] Assignee: Electroline Equipment Inc., Montreal, Canada

[21] Appl. No.: 586,812

[22] Filed: Sep. 24, 1990

[30] Foreign Application Priority Data

Sep. 12, 1990 [CA] Canada ................................ 2025110

[51] Int. Cl.[5] ........................................ G06F 9/315

[52] U.S. Cl. .................................... 395/425; 361/191; 307/37; 364/DIG. 1; 364/239.2; 364/239.5; 364/239.9

[58] Field of Search ............... 395/425, 725, 189, 183, 395/139, 166, 191; 307/37, 11, 38, 12, 415; 379/102, 104, 105; 364/DIG. 1, DIG. 2; 361/189, 183, 139, 166, 191

[56] References Cited

U.S. PATENT DOCUMENTS

| | | | |
|---|---|---|---|
| 4,040,119 | 8/1977 | Dalpee | 361/191 |
| 4,172,525 | 10/1979 | Hams et al. | 209/564 |
| 4,262,320 | 4/1981 | Herron | 361/191 |
| 4,820,935 | 4/1989 | Gontowski | 307/112 |
| 4,903,293 | 2/1990 | Ovadia et al. | 379/102 |
| 4,903,294 | 2/1990 | Grantland et al. | 379/150 |
| 5,045,832 | 9/1991 | Tam | 338/334 |
| 5,046,823 | 9/1991 | Mori et al. | 359/56 |
| 5,056,012 | 10/1991 | Spiotto et al. | 395/425 |
| 5,113,217 | 5/1992 | Izumi et al. | 354/471 |
| 5,146,577 | 9/1992 | Babin | 395/425 |

*Primary Examiner*—Michael R. Fleming
*Assistant Examiner*—Ayaz R. Sheikh
*Attorney, Agent, or Firm*—Norman B. Rainer

[57] ABSTRACT

Multiple latching relays are driven on their first side by all but one of the parallel outputs of a shift register. Each relay on the same shift register is driven on its second side by the remaining parallel output of the shift register. A clock signal is fed to all shift registers and causes each shift register to shift all of its information one cell on the selected edge of the clock signal. A latch signal or blanking signal is used to prevent the shift registers from outputting their information to the relays during shifting. A serial data message is inputted to the first shift register and then from the first shift register sequentially to all of the other shift registers. The information in the serial data message is such that after shifting of all shift registers is complete the appropriate signal will be on each side of each latching relay to cause it to either change or remain unchanged. The result is that one serial data line, one clock line and one latching or blanking line controls all of the relays and that additional relays can be controlled simply by adding more shift registers and sending more data down the serial data line.

8 Claims, 3 Drawing Sheets initial serial pattern : 01010011

| CLOCK CYCLES | CELL OUTPUTS 1 | 2 | 3 | 4 | 5 | 6 | 7 | 8 | SR or BSR outputs (before latch signal or during blanking signal) 1 | 2 | 3 | 4 | 5 | 6 | 7 | 8 |
|---|---|---|---|---|---|---|---|---|---|---|---|---|---|---|---|---|
| 0 | – | – | – | – | – | – | – | – | – | – | – | – | – | – | – | – |
| 1 | 1 | – | – | – | – | – | – | – | – | – | – | – | – | – | – | – |
| 2 | 1 | 1 | – | – | – | – | – | – | – | – | – | – | – | – | – | – |
| 3 | 0 | 1 | 1 | – | – | – | – | – | – | – | – | – | – | – | – | – |
| 4 | 0 | 0 | 1 | 1 | – | – | – | – | – | – | – | – | – | – | – | – |
| 5 | 1 | 0 | 0 | 1 | 1 | – | – | – | – | – | – | – | – | – | – | – |
| 6 | 0 | 1 | 0 | 0 | 1 | 1 | – | – | – | – | – | – | – | – | – | – |
| 7 | 1 | 0 | 1 | 0 | 0 | 1 | 1 | – | – | – | – | – | – | – | – | – |
| 8 | 0 | 1 | 0 | 1 | 0 | 0 | 1 | 1 | – | – | – | – | – | – | – | – |
| X | after latch signal or blanking signal ends | | | | | | | | 0 | 1 | 0 | 1 | 0 | 0 | 1 | 1 |

normally the latch signal would not be sent or the blanking signal would be sent after the 8th clock cycle for a SR or BSR controlling 8 LRs.

METHOD AND DEVICE FOR DRIVING MULTIPLE LATCHING RELAYS

BACKGROUND OF THE INVENTION

1. Field of the Invention

The present invention relates in general to circuits for controlling a multiple of latching relays; in particular the present invention relates to a method and device design for controlling a multiple of latching relays which may be used as computer controlled switches.

2. Description of Related Art

Latching relays are well known in the art, and methods for controlling a single latching relay, or a few latching relays are also known. Prior art methods of controlling a single latching relay have included using one of a pair of power supplies for momentarily coupling the coil of a latching relay to set or reset the relay, depending on the power supply to which it was coupled. To use methods involving a pair of power supplies for each relay often also involves using a pair of switching devices for each relay. To control a multiple of latching relays with the known dual power supply methods often requires a duplication of most control components for each relay. The result would be a very expensive and complicated device with many components.

More sophisticated devices also exist in the prior art to control a multiple of latching relays, such as the device invented by Dalphee et al, disclosed in U.S. Pat. No. 4,040,119. In the Dalphee device a computer sends a control signal to a first monostable multivibrator which enables output driving devices that provide an operating current and voltage to latch each relay in a first position. The first monostable multivibrator then triggers a second monostable multivibrator which operates in conjunction with logic means to enable output driving devices that provide an operating voltage and current to latch selected relays in a second position. The Dalphee device therefore requires, for each relay to be controlled, a separate control line, a separate output driving device to provide operating current and voltage, and a large number of control components.

The known methods in the art to control a multiple of latching relays, in general, rely on at least one separate output driving device to provide operating current and voltage for each relay, and one separate control line for each relay. It is therefore not a simple matter to add or remove relays from the system, as a large number of components are involved when adding or removing even a single relay. A further draw back is that each time new relays are added, a new control line has to be added to the relay and also to the controlling computer or other controlling means. Therefore, if you wanted to control, for example, 900 relays, 900 control lines and 900 output driving devices would be needed. To add a further 50 relays, the controlling computer, or other controlling means, would have to be physically opened to add 50 additional control lines, and 50 additional control lines would have to be run to the 50 additional driving devices for the 50 additional relays.

A further draw back to many of the known methods of controlling a multiple of latching relays, is that to change the state of any one or any number of relays, all relays in the system have to be momentarily reset, and then those that are to be set would be immediately thereafter set.

SUMMARY OF THE INVENTION

An object of the present invention was to devise a method and device to accomplish said method that would allow a large multiple of latching relays to be computer controlled. A second object of this invention was to devise a method that resulted in devices which could have one, or a small multiple, or a large multiple of relays added on to them or removed from them without substantially affecting the relays that are not added or removed. A third object of this invention was to devise a method and device that could set or reset a single relay or multiple of individual relays without even momentarily affecting the state of the relays that were not being set or reset. A fourth object of the present invention was to provide a method and device which could control any number of relays with only one serial data line, one clock line and one blanking or latching line, thereby negating a need to enter the controlling computer no matter how many relays are added or removed. A fifth object of the present invention was to provide a method and device which could control tens, hundreds, or thousands of relays.

The method of the present invention to control single coil Latching Relays ("LR"s) is comprised of: using a controller which puts out a serial data signal, a clock signal, and a latch signal; where P is an integer and N is an integer, using P serial input/parallel output shift registers ("SR"s), each of which has N+1 memory cells ("cells"), N+1 memory cell outputs ("outputs"), one serial data output, and three inputs; sending the serial data signal from the controller to a first input of the first SR, sending the serial data signal from the first SR's serial data output to a first input of the second SR, sending the serial data signal from the second SR's serial data output to a first input of the third SR, and so on; sending the clock signal from the controller to a second input of each SR; sending the latch signal from the controller to a third input of each SR; driving each LR on its first side by a unique one of N of the N+1 outputs of a SR; driving all of the LRs which are connected to the same SR, on their second side, by the unused one of the N+1 outputs (the "common output") of that SR; placing suitable buffers to sink or source current between each of the N+1 outputs of each SR and the LRs they are connected to; wherein the clock signal has a rising edge and a falling edge, one of which is chosen to be the appropriate command of the clock signal to cause the SRs to shift their data one cell location; wherein the P SRs each shift their data one cell location on each appropriate command of the clock signal; and wherein the SRs do not release their cells' data signals to their N+1 outputs until they receive the latch signal; sending out a serial data signal which contains data in an order such that, knowing what data signal will be at the respective common output of each respective SR immediately after the latch signal, which will be, for each respective SR, the respective data signals on the second sides of all of the LRs on each respective SR, the serial data is sent in an order such that immediately after the latch signal, the various data signals that are on each of the not common outputs of each SR will be such that only those LRs which are to either set or reset will have the appropriate different data signal on their first side; sending sufficient appropriate commands of the clock signal to cause the first bit of data in the serial data signal to be in the N+1th cell of the Pth SR before sending the latch signal; then sending the latch signal.

A device to control a multiple of LRs is comprised of: a controller which puts out a serial data signal, a clock signal, and a latch signal; where P is an integer and N is an integer, P SRs, each of which has N+1 cells, N+1 outputs, one serial data output, and three inputs; coupling a first input of the first SR with the serial data signal from the controller, coupling a first input of the second SR with the serial data output of the first SR, coupling a first input of the third SR with the serial data output of the second SR, and so on; coupling a second input of each SR with the clock signal from the controller; coupling a third input of each SR with the latch signal from the controller; [P× (N+1)] buffers, each of which sinks or sources current; coupling each of the N+1 outputs of a SR with a buffer of its own, at its input end, and coupling each, except 1 (the "common output") of said coupled buffers, at its output end, to the first side of a different LR; and coupling the buffer which is coupled to the common output of a SR, at said buffer's output end, to the second sides of all of the LRs which are connected to the same SR; wherein the clock signal has a rising edge and a falling edge one of which is chosen to be the appropriate command of the clock signal to cause the SRs to shift their data one cell location; wherein the P SRs each shift their data one cell location on each appropriate command of the clock signal; and wherein the SRs do not release their cells' data signals to their N+1 outputs until they receive the latch signal; and wherein the controller is able to put out a serial data signal which contains data in an order such that, knowing what the respective common output of each respective SR will be immediately after the latch signal, which will be, for each respective SR, the respective data signals on the second sides of all of the LRs on each respective SR, the serial data is sent in an order such that immediately after the latch signal, the various data signals that are on each of the not common outputs of each SR will be such that only those LRs which are to either set or reset will have the appropriate different data signal on their first side.

There are many advantages to the invention. It allows a large multiple of relays to be controlled. A single relay or a small multiple of relays, or a large multiple of relays can be added on to it or removed from it without substantially affecting the relays that are not added or removed. It can set or reset a single relay or multiple of individual relays without even momentarily affecting the state of the relays that were not being set or reset. It can control any number of relays with only one serial data line, one clock line and one latching line, thereby negating the need to enter the controlling means no matter how many relays are added or removed.

Description of the Preferred Embodiment

A preferred embodiment of a method according to the invention consists of: using a controller which puts out a serial data signal, a clock signal, and a blanking signal; using P serial input/parallel output buffered shift registers ("BSR"s); a BSR is a SR in which the outputs have been designed to sink and source current; wherein each of the P BSRs has N+1 cells, N+1 outputs, one serial data output, and three inputs; sending the serial data signal from the controller to a first input of the first BSR, sending the serial data signal from the first BSR's serial data output to a first input of the second BSR, sending the serial data signal from the second BSR's serial data output to a first input of the third BSR, and so on; sending the clock signal from the controller to a second input of each BSR; sending the blanking signal from the controller to a third input of each BSR; driving each LR on its first side by a unique one of the first N outputs of a BSR; driving all of the LRs which are connected to the same BSR, on their second side, by the N+1th output of that BSR; wherein the clock signal has a rising edge and a falling edge one of which is chosen to be the appropriate command of the clock signal to cause the BSRs to shift their data one cell location; wherein the P BSRs each shift their data one cell location on each appropriate command of the clock signal; and wherein the blanking signal brings all N+1 outputs of each BSR to the same logic level; sending out a serial data signal which contains data in an order such that, knowing what the respective N+1th output of each respective BSR will be immediately after the blanking signal ends, which will be, for each respective BSR, the respective data signals on the second sides of all of the LRs on the respective BSRs, the serial data is sent in an order such that immediately after the blanking signal ends, the various data signals on each of the first N outputs of each BSR will be such that only those LRs which are to either set or reset will have the appropriate different data signals on their first side; sending sufficient appropriate commands of the clock signal to cause the first bit of data in the serial data signal to be in the N+1th cell of the Pth SR before ceasing to send the blanking signal; then ceasing to send the blanking signal.

Figure 1:
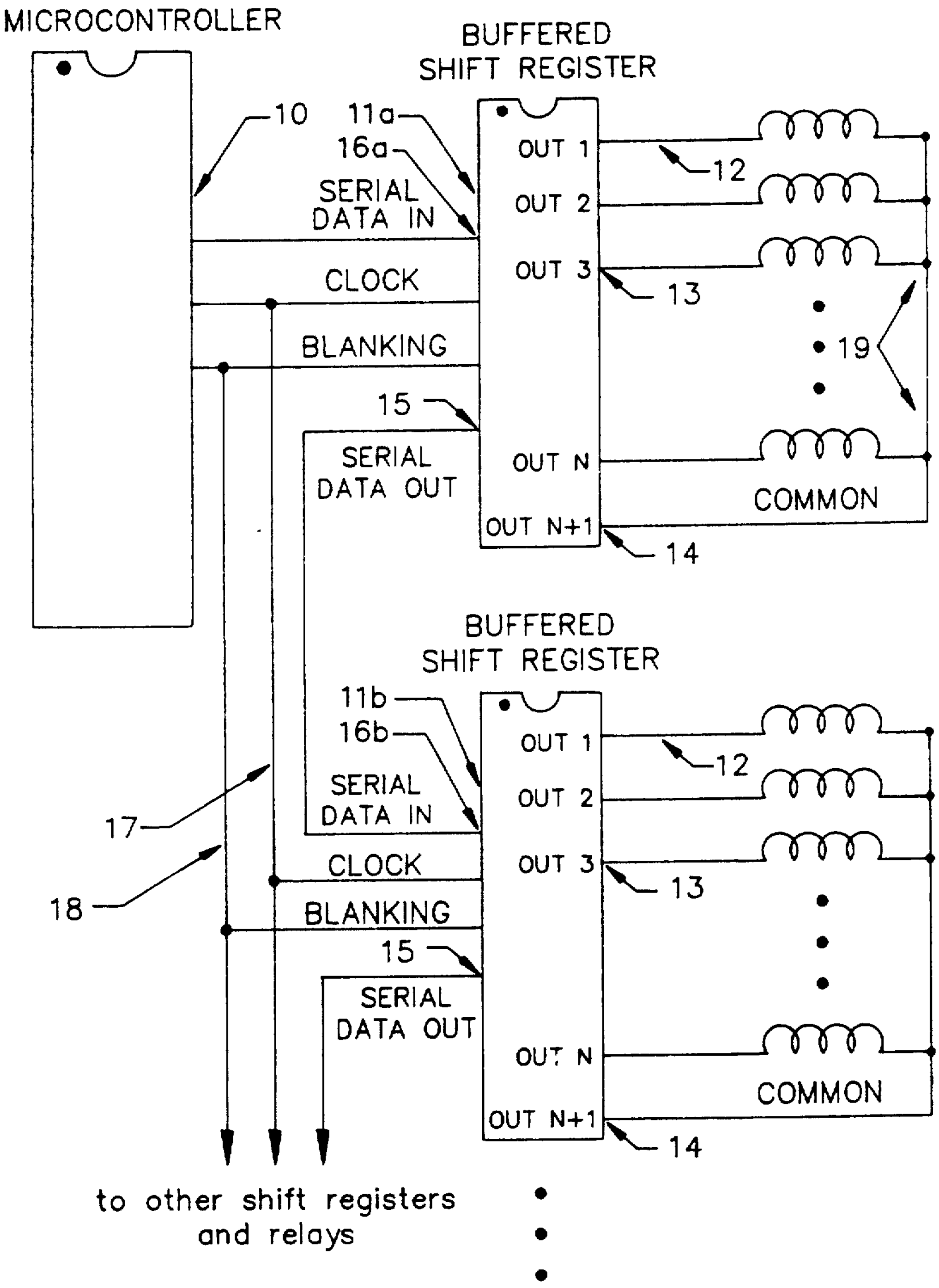
FIG. 1 is a block diagram of a preferred embodiment of a device according to the invention.

FIG. 1 illustrates a preferred embodiment of a device according to the invention. The FIG. 1 device is made up of a microcontroller 10, P BSRs, 11*a*, 11*b*, . . . 11*p*, and lines as at 17 and 18 connecting the microcontroller to the BSRs and the BSRs to each other. The microcontroller 10 puts out a serial data signal, a clock signal, and a blanking signal. The serial data signal contains the bits of information which are to control the LRs. The clock signal has a rising edge and a falling edge, either of which can be used to cause the BSRs to shift their data one cell location. Whether one chooses to design the BSRs such that the rising edge or the falling edge of the clock signal is the appropriate clock signal to cause the BSRs to shift is a matter of the designer's preference. In the design illustrated in FIG. 1 the rising edge of the clock signal is used as the appropriate clock signal.

The blanking signal, when it is not transmitted, allows the BSRs to output the information which is at their N+1 outputs; while the blanking signal is transmitted it brings all of the N+1 outputs to the same logic level. In the alternative to a blanking signal a latch signal can be used. When a latch signal is used, until the latch signal is present all N+1 outputs are blank because until the latch signal is received the BSR does not release its data to its outputs. Accordingly, a blanking signal operates in the opposite way to a latching signal, however, they both have the same practical effect on the BSRs, which is to prevent them from outputting their information at their N+1 outputs during shifting.

Figure 4:
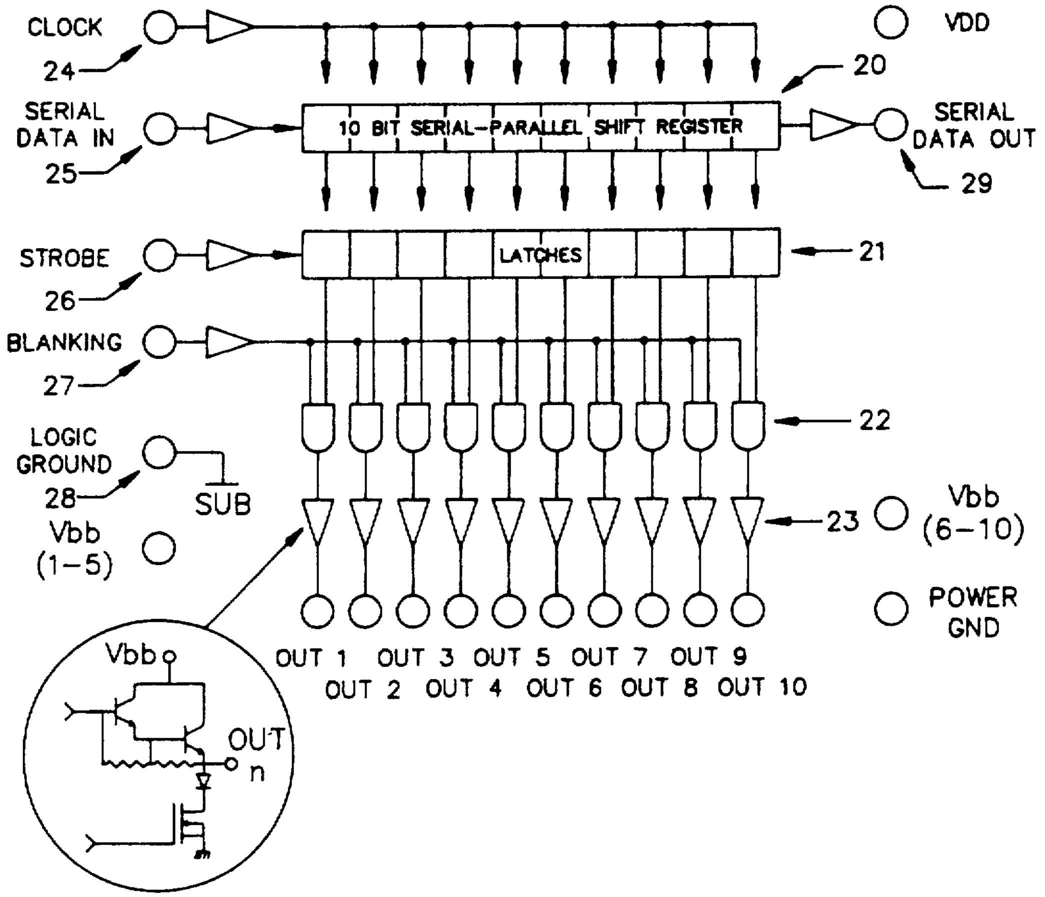
FIG. 4 is a block diagram of a Buffered Shift Register suitable for use in a preferred embodiment of a device according to the invention.

The microcontroller, it can be seen, may be any suitable computing means, and will depend on the purpose for which the LRs are being controlled. The BSRs are a serial input/parallel output integrated circuit with N+1 buffered outputs. FIG. 4 illustrates the circuit design of a BSR used in the preferred embodiment of FIG. 1. The BSR illustrated in FIG. 4 is made up of: a ten bit serial-in/parallel-out shift register 20, which also has a buffered serial data output 29; a ten bit latch memory 21; a blanking input and buffer 27; a disable circuit 22, which is controlled by the blanking signal it receives from the blanking input and buffer; ten output buffers 23, able to sink and source up to 40 mA; a clock input and buffer 24; a serial data input and buffer 25; a strobe input and buffer 26; and a logic ground 28.

In the BSR illustrated in FIG. 4 the initial rising edge of the clock signal causes the serial data at the serial data input of the shift register to be transferred to the shift register. Then, each rising edge of the clock signal that comes next causes the registers to shift data information towards the serial data output. (It should be noted that the serial data must appear at the input prior to the first rising edge of the clock signal.)

The strobe input is always held high and only the blanking input is used to control the state of the output drivers. The output buffers 23 are each made up of Cmos driving transistors to sink current and Bipolar output driving transistors to source current. When the blanking input is high, the output driving transistors are disabled (i.e. off) and the Cmos driving transistors are on. The information stored in the latches is not affected by the blanking input. The outputs are controlled by the state of their own latches when the blanking input is low. It is preferable that the BSR has a dual power supply, a logic supply of 5 to 12 volts is preferred, with a lower supply being preferred to a higher one. An output stage supply of 60 to 135 volts is preferred, with a lower supply being preferred to a higher one. However, it should be noted that the output stage supply depends on the type of LRs to be controlled, the loss inside the driving transistors, and the maximum voltage induced by the LRs when power is removed. It is also preferable that the BSR has an "off" state on every output when blanking is high; that gives the advantage of draining the residual current of the LRs' coils when power is removed, which avoids the need to install devices between each LRs coils. An example of a BSR which could be used in the preferred embodiment of FIG. 1 is the BSR manufactured by Sprague and sold under the trademark "UCN-5910A".

The serial data signal output of the microcontroller 10 is coupled to the first input of the first BSR, as at 16*a*. The first input of every BSR, as at 16*b*, except the first BSR, is coupled to the serial data output, as at 15, of the BSR preceding it. The clock signal output of the microcontroller 10 is coupled to the second input of every BSR, as by line 17; and the blanking signal output of the microcontroller 10 is coupled to the third input of every BSR, as by line 18.

The LRs are connected to the preferred embodiment illustrated in FIG. 1 by each having its first side 12 coupled with a unique one of the first N outputs of one of the BSRs. The second sides 19 of all of the LRs coupled to the same BSR are coupled to the N+1th output 14 of that BSR.

The primary function of the BSR is to translate a serial data message into a parallel word. A serial data message is made of consecutive bits, being 0s and 1s, that are sent one after the other on a single line, the serial data line. A parallel word is a group of "m" lines that, at a precise moment, contains a binary value made of a 1 or a 0. The BSR can be seen as a set of "m" cells hooked up in series, each cell being a memory controlled by the rising edge or falling edge (depending on the BSR) of the clock signal. Every time a cell receives an appropriate edge on its clock input, it shifts its data signal to the cell following it. Accordingly, after "m" correct edges, the first bit of the message appears at the m'th cell, as illustrated in FIG. 2.

Figures 2, 3:
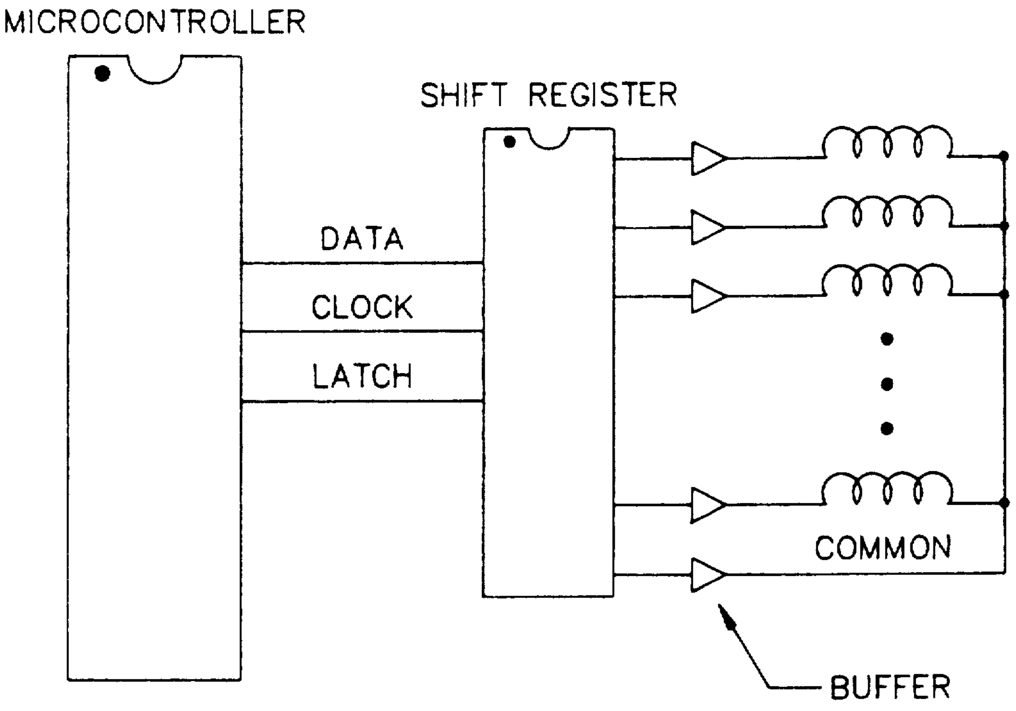
FIG. 2 is a chart illustrating the shift pattern within a SR.
FIG. 3 is a block diagram of a SR, with buffers, connected to LRs.
Figure 5:
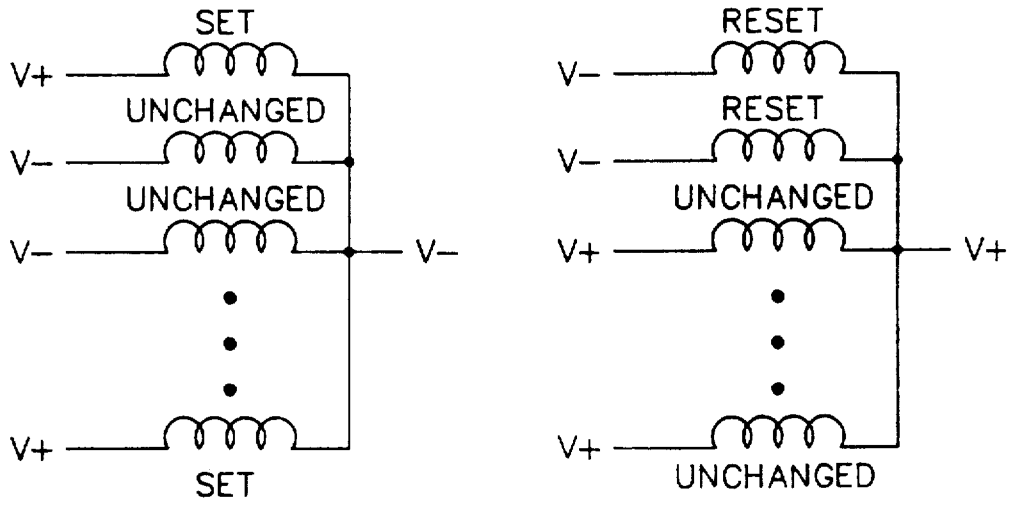
FIG. 5 illustrates the effect of a common line in controlling LRs.

FIG. 2 illustrates the state of the N+1 outputs of one SR or BSR with N+1=8. It can be seen that without the latch signal, or during the blanking signal, depending on which is used, the 8 outputs are blank, accordingly, they do not cause the LRs to set or reset. The 8th cell is the common connection to all of the second sides of the LRs on the SR or BSR. The controller sends out the serial data signal in an order such that, knowing what the output will be on the N+1th cell, which will be the signal on the second side of all of the LRs on the SR or BSR, the output on the first N cells, after the blanking signal ceases or the latch signal is received, will be such that only those LRs which are to either set or reset will have the appropriate different signal on their first side. The result will be that those LRs which are not to either set or reset will not even momentarily change their state as shown in FIG. 5.

The operation of the preferred method and device are very straight forward. The controller is programmed to be aware of what state of logic each second side of each LR will be put to. For example, if the BSR being used has N=9, then the first bit of information and every 10th bit of information thereafter will be the respective logic states of the second sides of all of the LRs on the respective BSRs. The controller then sends out the respective various intermediate 9 bits of information, between the first and thereafter every 10th bit of information, such that only those LRs which are to change have different logic states on their first and second sides. The controller sends out sufficient data to supply one bit of information to each cell of each BSR. The controller also sends out sufficient appropriate clock signals to cause the first bit of information in the serial data signal to have been shifted to the N+1th cell location of the last BSR, then the controller ceases to send the blanking signal.

One serial data line, one clock line and one blanking or latching line can control one, ten, or thousands of LRs. Adding LRs only requires sending more information down the serial data line, and adding BSRs. Because each BSR's second input is coupled to the clock signal, each BSR will always shift all of its data one cell location on the clock signal. Because each BSR's third input is coupled to the blanking signal, while it is present, all N+1 outputs of each BSR will be at the same logic level, and therefore will not cause any of the LRs to change their state.

The device illustrated in FIG. 1 can control (P×N) LRs. It could easily control additional LRs simply by adding more BSRs and sending more data down the serial data line.

All methods and devices of the invention have many advantages. They all allow a large multiple of relays to be controlled. A single relay or a small multiple of relays, or a large multiple of relays can be added on or removed without substantially affecting the relays that are not added or removed. They can set or reset a single relay or multiple of individual relays without even momentarily affecting the state of the relays that were not being set or reset. They can control any number of relays with only one serial data line, one clock line, and one latching or blanking line, thereby negating the need to enter the controlling means no matter how many relays are added or removed.

Variations to the preferred method and device can be made within the scope of the invention. For example, a BSR which uses a latch signal instead of a blanking signal may be used. SRs instead of BSRs may be used in other embodiments. The disadvantage to using SRs is that buffers such as that illustrated in FIG. 3 must be used to sink or source current between the N+1 outputs and the LRs. The buffers of FIG. 3 are amplifier-drivers which sink or source current. The N+1th output need not be the common output to the second sides of all LRs on the SR or BSR. Any on the N+1 outputs can be used as the common output of the second sides. The controlling device is programmed to know which output will be the common output, and therefore, will "know" how to order the serial data signal it sends to the first SR or BSR. Further and other variations will be obvious to those skilled in the art, and are accordingly within the scope of the invention and following claims.

We claim:

1. A method to control a multiple of latching relays comprised of:

a) having a controller which puts out a serial data signal, a clock signal, and a latch signal;
b) where P is an integer and N is an integer, using P shift registers (SRs) the first of which is referred to as the first SR, the second of which is referred to as the second SR, and so on, each SR having N+1 memory cells, hereinafter called "cells", N+1 memory cell outputs, hereinafter called "outputs", one serial data output, and a first input, a second input, and a third input;
c) sending the serial data signal from the controller to the first input of the first SR;
d) sending the clock signal from the controller to the second input of each SR;
e) sending the latch signal from the controller to the third input of each SR;
f) sending the serial data signal from the serial data output of each SR to the first input of the following SR;
g) driving each latching relay on its first side by a unique one of N of the N+1 outputs of a SR thereby leaving one output of each SR unused;
h) driving all the latching relays which are connected to the same SR, on their second side, by the unused one of the N+1 outputs, hereinafter referred to as the "common output", of that SR;
i) placing a suitable buffer that sinks or sources current between each of the N+1 outputs of each SR and the latching relays they are connected to;
j) wherein the clock signal has a rising edge and a falling edge, one of which is chosen to be the appropriate command of the clock signal to cause the SRs to shift all of their data down one cell;
k) having the P SRs each shift their data down one cell on each appropriate command of the clock signal;
l) wherein the SRs do not release their cell information to their N+1 outputs until they receive the latch signal;
m) sending out a serial data signal which contains sufficient data to supply one bit of information to each cell of each SR, in an order such that, knowing what the respective outputs will be on the common cell of each SR, immediately after the latch signal, which will be the respective signals on the second sides of all of the latching relays on the respective SRs, the serial data is sent in an order such that immediately after the latch signal the various data signals that are on each of the N not common outputs of each SR will be such that only those latching relays which are to either set or reset will have the appropriate different signal on their first side; and
n) sending out sufficient appropriate clock signals to cause the first bit of information in the serial data signal to have been shifted to the N+1th memory cell of the last SR before the latch signal, and then sending the latch signal.

2. A method to control a multiple of latching relays comprised of:

a) having a controller which puts out a serial data signal, a clock signal, and a latch signal;
b) where P is an integer and N is an integer, using P buffered shift registers (BSRs) the first of which is referred to as the first BSR, the second of which is referred to as the second BSR, and so on, each of which has N+1 memory cells, hereinafter called "cells", N+1 memory cell outputs, hereinafter called "outputs", one serial data output, and a first input, a second input, and a third input;
c) sending the serial data signal from the controller to the first input of the first BSR;
d) sending the clock signal from the controller to the second input of each BSR;
e) sending the latch signal from the controller to the third input of each BSR;
f) sending the serial data signal from the serial data output of each BSR to the first input of the following BSR;
g) driving each latching relay on its first side by a unique one of N of the N+1 outputs of a BSR thereby leaving one output of each BSR unused;
h) driving all of the latching relays which are connected to the same BSR, on their second side, by the unused one of the N+1 outputs, hereinafter referred to as the "common output", of that BSR;
i) wherein the clock signal has a rising edge and a falling edge, one of which is chosen to be the appropriate command of the clock signal to cause the BSRs to shift all of their data down one cell;
j) having the P BSRs each shift their data down one cell on each appropriate command of the clock signal;
k) wherein the BSRs do not release their cell information to their N+1 outputs until they receive the latch signal;
l) sending out a serial data signal which contains sufficient data to supply one bit of information to each cell of each BSR, in an order such that, knowing what the respective outputs will be on the common output of each BSR immediately after the latch signal, which will be the respective signals on the second sides of all of the latching relays on the respective BSRs, the serial data is sent in an order such that immediately after the latch signal the various outputs on each of the N not common outputs of each BSR will be such that only those latching relays which are to either set or reset will have the appropriate different signal on their first side; and m) sending out sufficient clock signals to cause the first bit of information in the serial data signal to have been shifted to the N+1th cell of the last BSR before sending the latch signal, and then sending the latch signal.

3. A method to control a multiple of latching relays comprised of:

a) having a controller which puts out a serial data signal, a clock signal, and a blanking signal;

b) where P is an integer and N is an integer, using P shift registers (SRs) the first of which is referred to as the first SR, the second of which is referred to as the second SR, and so on, each of which has N+1 memory cells, hereinafter called "cells", N+1 memory cell outputs, hereinafter called "outputs", one serial data output, and a first input, a second input, and a third input;

c) sending the serial data signal from the controller to the first input of the first SR;

d) sending the clock signal from the controller to the second input of each SR;

e) sending the blanking signal from the controller to the third input of each SR;

f) sending the serial data signal from the serial data output of each SR to the first input of the following SR;

g) driving each latching relay on its first side by a unique one of N of the N+1 outputs of a SR thereby leaving one output of each SR unused;

h) driving all of the latching relays which are connected to the same SR, on their second side, by the unused one of the N+1 outputs, hereinafter referred to as the "common output", of that SR;

i) placing a suitable buffer that sinks or sources current between each of the N+1 outputs of each SR and the latching relays they are connected to;

j) wherein the clock signal has a rising edge and a falling edge, one of which is chosen to be the appropriate command of the clock signal to cause the SRs to shift all of their data down one cell;

k) having the P SRs each shift their data down one cell on each appropriate command of the clock signal;

l) wherein the blanking signal, while it is present, brings each of the N+1 outputs of the SRs to the same logic level;

m) sending out a serial data signal which contains sufficient data to supply one bit of information to each cell of each SR, in an order such that, knowing what the respective outputs will be on the common output of each SR immediately after the blanking signal ends, which will be the respective signals on the second sides of all of the latching relays on the respective SRs, the serial data is sent in an order such that immediately after the blanking signal ends the various outputs on the N not common outputs of each SR will be such that only those latching relays which are to either set or reset will have the appropriate different signal on their first side; and n) sending out sufficient clock signals to cause the first bit of information in the serial data signal to have been shifted to the N+1th cell of the last SR before the blanking signal ceases, and then ceasing to send the blanking signal.

4. A method to control a multiple of latching relays comprised of:

a) having a controller which puts out a serial data signal, a clock signal, and a blanking signal;

b) where P is an integer and N is an integer, using P buffered shift registers (BSRs) the first of which is referred to as the first BSR, the second of which is referred to as the second BSR, and so on, each of which has N+1 memory cells, hereinafter called "cells", N+1 memory cell outputs, hereinafter called "outputs", one serial data output, and a first input, a second input and a third input;

c) sending the serial data signal from the controller to the first input of the first BSR;

d) sending the clock signal from the controller to the second input of each BSR;

e) sending the blanking signal from the controller to the third input of each BSR;

f) sending the serial data signal from the serial data output of each BSR to the first input of the following BSR;

g) driving each latching relay on its first side by a unique one of N of the N+1 outputs of a BSR thereby leaving one output of each BSR unused;

h) driving all of the latching relay which are connected to the same BSR, on their second side, by the unused one of the N+1 outputs, hereinafter referred to as the "common output", of that BSR;

i) wherein the clock signal has a rising edge and a falling edge, one of which is chosen to be the appropriate command of the clock signal to cause the BSRs to shift all of their data down one cell;

j) having the P BSRs each shift their data down one cell on each appropriate command of the clock signal;

k) wherein the blanking signal, while it is present, brings each of the N+1 outputs of the BSRs to the same logic level;

l) sending out a serial data signal which contains sufficient data to supply one bit of information to each cell of each BSR, in an order such that, knowing what the respective outputs will be on the common output of each BSR immediately after the blanking signal ends, which will be the respective signals on the second sides of all of the latching relays on the respective BSRs, the serial data is sent in an order such that immediately after the blanking signal ends the various outputs on the N not common outputs of each BSR will be such that only those latching relays which are to either set or reset will have the appropriate different signal on their first side; and m) sending out sufficient clock signals to cause the first bit of information in the serial data signal to have been shifted to the N+1th cell of the last BSR before the blanking signal ceases, and then ceasing to send the blanking signal.

5. A device to control a multiple of latching relays comprised of:

a) a controller which puts out a serial data signal, a clock signal, and a latch signal;

b) where P is an integer and N is an integer, P shift registers (SRs) the first of which is referred to as the first SR, the second of which is referred to as the second SR, and so on, each SR having N+1 memory cells, hereinafter called "cells", N+1 memory cell outputs, hereinafter called "outputs", plus one serial data output, and a first input, a second input, and a third input;

c) coupling the first input of the first SR with the serial data signal from the controller;

d) coupling the second input of each SR with the clock signal from the controller;

e) coupling the third input of each SR with the latch signal from the controller;

f) coupling the serial data output of each SR to the first input of the following SR;

g) [P× (N+1)] buffers each of which sinks or sources current;

h) coupling each of N of the N+1 outputs of each SR to a buffer of its own, at said buffer's input end, and individually coupling each of said coupled buffers, at its output end, to the first side of a latching relay of its own thereby leaving one output of each SR unused;

i) coupling the unused one of the N+1 outputs, hereinafter referred to as the "common output", of each SR to a buffer of its own, at said buffer's input end, and coupling said buffer, at its output end, to the second sides of all of the latching relays which are connected to the same SR;

j) wherein the clock signal has a rising edge and a falling edge, one of which is chosen to be the appropriate command of the clock signal to cause the SRs to shift all of their data down one cell;

k) wherein the P SRs each shift their data down one cell on each appropriate command of the clock signal;

l) wherein the SRs do not release their cell information to their N+1 outputs until they receive the latch signal; and m) wherein the controller is able to put out a serial data signal which contains sufficient data to supply one bit of information to each cell of each SR, in an order such that, knowing what the respective outputs will be on the common output of each SR immediately after the latch signal, which will be the respective signals on the second sides of all of the latching relays on the respective SRs, the serial data is sent in an order such that immediately after the latch signal the various outputs on the N not common outputs of each SR will be such that only those latching relays which are to either set or reset will have the appropriate different signal on their first side.

6. A device to control a multiple of latching relays comprised of:

a) a controller which puts out a serial data signal, a clock signal, and a latch signal;

b) where P is an integer and N is an integer, P buffered shift registers (BRSs) the first of which is referred to as the first BSR, the second of which is referred to as the second BSR, and so on, each BSR having N+1 memory cells, hereinafter called "cells", N+1 memory cell outputs, hereinafter called "outputs", plus one serial data output, and a first input, a second input, and a third input;

c) coupling the first input of the first BSR with the serial data signal from the controller;

d) coupling the second input of each BSR with the clock signal from the controller;

e) coupling the third input of each BSR with the latch signal from the controller;

f) coupling the serial data output of each BSR to the first input of the following BSR;

g) coupling each of N of the N+1 outputs of each BSR to the first side of a latching relay of its own thereby leaving one output of each BSR unused;

h) coupling the unused one of the N+1 outputs, hereinafter referred to as the "common output", of each BSR to the second sides of all of the latching relays which are connected to the same BSR;

i) wherein the clock signal has a rising edge and a falling edge, one of which is chosen to be the appropriate command of the clock signal to cause the BSRs to shift all of their data down one cell;

j) wherein the P BSRs each shift their data down one cell on each appropriate command of the clock signal;

k) wherein the BSRs do not release their cell information to their N+1 outputs until they receive the latch signal; and l) wherein the controller is able to put out a serial data signal which contains sufficient data to supply one bit of information to each cell of each BSR, in an order such that, knowing what the respective outputs will be on the common output of each BSR immediately after the latch signal, which will be the respective signals on the second sides of all of the latching relays on the respective BSRs, the serial data is sent in an order such that immediately after the latch signal the various outputs on the N not common outputs of each BSR will be such that only those latching relays which are to either set or reset will have the appropriate different signal on their first side.

7. A device to control a multiple of latching relays comprised of:

a) A controller which puts out a serial data signal, a clock signal, and a blanking signal;

b) where P is an integer and N is an integer, P shift registers (SRs) the first of which is referred to as the first SR, the second of which is referred to as the second SR, and so on, each SR having N+1 memory cells, hereinafter called "cells", N+1 memory cell outputs, hereinafter called "outputs", plus one serial data output, and a first input, a second input, and a third input;

c) coupling the first input of the first SR with the serial data signal from the controller;

d) coupling the second input of each SR with the clock signal from the controller;

e) coupling the third input of each SR with the blanking signal from the controller;

f) coupling the serial data output of each SR to the first input of the following SR;

g) [P× (N+1)] buffers each of which sinks or sources current;

h) coupling each of N of the N+1 outputs of each SR to a buffer of its own, at said buffer's input end, and individually coupling each of said coupled buffers, at its output end, to the first side of a latching relay of its own thereby leaving one output of each SR unused;

i) coupling the unused one of the N+1 outputs, hereinafter referred to as the "common output", of each SR to a buffer of its own, at said buffer's input end, and coupling said buffer, at its output end, to the second sides of all of the latching relays which are connected to the same SR;

j) wherein the clock signal has a rising edge and a falling edge, one of which is chosen to be the appropriate command of the clock signal to cause the SRs to shift all of their data down one cell;

k) wherein the P SRs each shift their data down one cell on each appropriate command of the clock signal;

l) wherein the blanking signal, while it is present, brings each of the N+1 outputs of the SRs to the same logic level; and m) wherein the controller is able to put out a serial data signal which contains sufficient data to supply one bit of information to each cell of each SR, in an order such that, knowing what the respective outputs will be on the common output of each SR immediately after the blanking signal ceases, which will be the respective signals on the second sides of all of the latching relays on the respective SRs, the serial data is sent in an order such that immediately after the latch signal the various outputs on the N not common outputs of each SR will be such that only those latching relays which are to either set or reset will have the appropriate different signal on their first side.

8. A device to control a multiple of latching relays comprised of:

a) a controller which puts out a serial data signal, a clock signal, and a blanking signal;

b) where P is an integer and N is an integer, P buffered shift registers (BSRs) the first of which is referred to as the first BSR, the second of which is referred to as the second BSR, and so on, each BSR having N+1 memory cells, hereinafter called "cells", N+1 memory cell outputs, hereinafter called "outputs", plus one serial data output, and a first input, a second input, and a third input;

c) coupling the first input of the first BSR with the serial data signal from the controller;

d) coupling the second input of each BSR with the clock signal from the controller;

e) coupling the third input of each BSR with the blanking signal from the controller;

f) coupling the serial data output of each BSR to the first input of the following BSR;

g) coupling each of N of the N+1 outputs of each BSR to the first side of a latching relay of its own thereby leaving one output of each BSR unused;

h) coupling the unused one of the N+1 outputs, hereinafter referred to as the "common output", of each BSR, to the second sides of all of the latching relays which are connected to the same BSR;

i) wherein the clock signal has a rising edge and a falling edge, one of which is chosen to be the appropriate command of the clock signal to cause the BSRs to shift all of their data down one cell;

j) wherein the P BSRs each shift their data down one cell on each appropriate command of the clock signal;

k) wherein the blanking signal, while it is present, brings each of the N+1 outputs of the BSRs to the same logic level; and l) wherein the controller is able to put out a serial data signal which contains sufficient data to supply one bit of information to each cell of each BSR, in an order such that, knowing what the respective outputs will be on the common output of each BSR immediately after the blanking signal ceases, which will be the respective signals on the second sides of all of the latching relays on the respective BSRs, the serial data is sent in an order such that immediately after the latch signal the various outputs on the N not common outputs of each BSR will be such that only those latching relays which are to either set or rest will have the appropriate different signal on their first side.

* * * * *